(12) United States Patent
Figge et al.

(10) Patent No.: US 6,242,512 B1
(45) Date of Patent: Jun. 5, 2001

(54) RE-DISPERSIBLE POLYMER POWDER AND AQUEOUS POLYMER DISPERSIONS OBTAINABLE THEREFROM

(75) Inventors: Reiner Figge, Ampfing; Harald Zeh; Rudolf Weissgerber, both of Burghausen, all of (DE)

(73) Assignee: Wacker Chemie GmbH, Munich (DE)

( * ) Notice: Subject to any disclaimer, the term of this patent is extended or adjusted under 35 U.S.C. 154(b) by 0 days.

(21) Appl. No.: 09/101,661
(22) PCT Filed: Jan. 16, 1997
(86) PCT No.: PCT/EP97/00171
§ 371 Date: Jul. 14, 1998
§ 102(e) Date: Jul. 14, 1998
(87) PCT Pub. No.: WO97/26295
PCT Pub. Date: Jul. 24, 1997

(30) Foreign Application Priority Data

Jan. 18, 1996 (DE) .............................. 196 01 699

(51) Int. Cl.[7] .............................. C08J 3/12; C08L 31/02; C08L 33/06
(52) U.S. Cl. .......................... 523/340; 523/206; 523/342; 524/819; 524/832; 524/833; 524/904; 525/198; 525/221; 525/934
(58) Field of Search .................................... 524/832, 904; 525/198, 221, 934; 523/340, 206

(56) References Cited

U.S. PATENT DOCUMENTS

| | | |
|---|---|---|
| 4,859,751 | 8/1989 | Schulze et al. . |
| 5,118,751 | 6/1992 | Schulze et al. . |
| 5,225,478 | 7/1993 | Beckerle et al. . |
| 5,342,897 | 8/1994 | Franzman et al. . |
| 5,679,735 | * 10/1997 | Geissler et al. ...................... 524/459 |

FOREIGN PATENT DOCUMENTS

| | | |
|---|---|---|
| 4030638 | 4/1992 | (DE) . |
| 0149098 | 7/1985 | (EP) . |
| 0134451 | 2/1989 | (EP) . |
| 0467103 | 1/1992 | (EP) . |

OTHER PUBLICATIONS

Derwent Abstract corresponding to EP A34451 A (# 85–069875).

* cited by examiner

*Primary Examiner*—Tae H. Yoon
(74) *Attorney, Agent, or Firm*—Milton J. Wayne; William R. Moran; Burgess, Ryan & Wayne

(57) ABSTRACT

The invention provides a redispersible polymer powder based on a mixture of water-insoluble polymer and a water-soluble atomized protective colloid which can be de-activated through a pH change. In addition, the invention concerns aqueous dispersions that can be prepared with the polymer powder and the use of the polymer powder or its aqueous dispersions as a bonding agent in adhesives, plasters or paints.

11 Claims, No Drawings

RE-DISPERSIBLE POLYMER POWDER AND AQUEOUS POLYMER DISPERSIONS OBTAINABLE THEREFROM

BACKGROUND OF THE INVENTION

Field of the Invention

The invention relates to redispersible polymer powders based on a mixture of a water-insoluble, film-forming polymer and a water-soluble atomizing protective colloid which can be deactivated by a change in pH. The invention furthermore relates to aqueous dispersions which can be prepared with the polymer powder.

BACKGROUND ART

Dispersion powders have been employed for many years, in particular in the building sector for modifying hydraulically setting systems with plastics, and in plasters, paints and adhesives. Substantial improvements in the properties of adhesion, abrasion resistance, scratch resistance and flexural strength are achieved by the addition or use of redispersible powders of plastics in such systems. The great advantage of dispersion powders over liquid polymer dispersions, which can likewise be employed as an alternative, is, inter alia, a high storage stability without additions of preservatives and the frost resistance of the pulverulent dry mixtures.

The dispersion powders known to date comprise water-soluble atomizing protective colloids which are added to the polymer dispersion to be dried, as a rule before the spray drying, and which are said to prevent premature film formation of the base polymer on which the dispersion powder is based, for example during spray drying, and which allow redispersion of the polymer powder in water.

Polyvinyl alcohols are chiefly employed as the protective colloids for this. Examples of these are described, for example, in DE-A 4030638 (U.S. Pat. No. 5,118,751) and in EP-A 149098 (U.S. Pat. No. 4,859,751). Dispersion powders which comprise water-soluble salts of phenolsulphonic acid-formaldehyde condensates as atomizing protective colloids are known from EP-A 407889 (U.S. Pat. No. 5,225,478). The use of naturally occurring substances such as dextrins or starch ethers as an atomizing protective colloid and the use of such dispersion powders in adhesives and hydraulically hardening binders is known from EP-A 134451. EP-A 467103 (U.S. Pat. No. 5,342,897) describes the preparation of dispersion powders by spray drying polymer dispersions which comprise water-soluble copolymers of unsaturated acids or anhydrides thereof and alkene or styrene.

The water-soluble protective colloids mentioned prevent premature film formation of the polymers during drying of the dispersion and first allow redispersion (i.e. substantial disintegration into the primary particles of the base dispersion) of the dry polymer powder in water. In many applications, however, the protective colloids employed in the known dispersion powders have an adverse effect on the properties of the products. Because of the protective colloid character of the water-soluble atomizing aids, when the already known dispersion powders are employed as binders in adhesives, for example, the adhesiveness thereof can be adversely influenced or destroyed entirely because of the content of atomizing protective colloid. In paints and plasters, permanently water-soluble atomizing protective colloids can severely impair resistance to water.

The invention was therefore based on the object of providing a dispersion powder composition which is redispersible in water and in which the action of the atomizing protective colloid employed can be eliminated in a controlled manner during use.

SUMMARY OF THE INVENTION

Surprisingly, it has now been found that this object can be achieved by the use of low molecular weight water-soluble polymers based on acrylic acid, methacrylic acid or maleic acid (anhydride) as the atomizing protective colloid.

The invention relates to a dispersion powder composition which is redispersible in water and comprises a) a water-insoluble, film-forming base polymer having a glass transition temperature of −60° C. to +80° C. from the group consisting of homo- and copolymers of vinyl esters, acrylic acid esters, methacrylic acid esters, styrene and vinyl chloride, or a mixture of the base polymers mentioned, b) 2 to 40% by weight, based on the base polymer, of a water-soluble atomizing protective colloid, and c) 0 to 30% by weight, based on the total weight of polymeric constituents, of an antiblocking agent, characterized in that it comprises, as component b), non-neutralized homo- or copolymers of olefinically unsaturated mono- or dicarboxylic acids or anhydrides thereof, or partly neutralized homopolymers of olefinically unsaturated mono- or dicarboxylic acids or anhydrides thereof, or partly neutralized copolymers of olefinically unsaturated mono- or dicarboxylic acids or anhydrides thereof having an acid content of >80 mol % in the case of copolymers with $C_3$- to $C_{12}$-alkenes or styrene and an acid conteqt of 50 to 99 mol % in the case of the other copolymers, the molecular weight of the polymers mentioned being $\leq 250{,}000$ g/mol, determined as the weight-average, and the pH of the aqueous redispersion of the dispersion powder composition being less than 4.5.

DESCRIPTION OF THE PREFERRED EMBODIMENT

Vinyl ester homo- or copolymers which are suitable as component a) comprise one or more monomer units from the group consisting of vinyl esters of unbranched or branched carboxylic acids having 1 to 18 C atoms. Suitable (meth) acrylic acid ester polymers are homo- and copolymers of acrylic acid and methacrylic acid with unbranched or branched alcohols having 1 to 18 C atoms.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 5 or 9 to 10 C atoms, for example $VV5^R$, $VeoVa9^R$ or $VeoVa10^R$ (trademarks of Shell Corp.). Vinyl acetate is particularly preferred.

Preferred methacrylic acid esters or acrylic acid esters are methyl acrylate, methyl methacrylate, ethyl acrylate, ethyl methacrylate, propyl acrylate, methyl methacrylate, n-butyl acrylate and 2-ethylhexyl acrylate are particularly preferred.

Examples of suitable vinyl ester polymers are:

vinyl ester homopolymers, such as vinyl acetate homopolymer;

vinyl ester/ethylene copolymers, such as vinyl acetate/ethylene copolymers having an ethylene content of 1 to 60% by weight;

vinyl ester/ethylene/vinyl chloride copolymers, such as vinyl acetate/ethylene/vinyl chloride copolymers having an ethylene content of 1 to 40% by weight and a vinyl chloride content of 20 to 80% by weight;

vinyl acetate copolymers with 1 to 50% by weight of one or more copolymerizable vinyl esters, such as vinyl laurate, vinyl pivalate, vinyl 2-ethylhexanoate or vinyl esters of an α-branched carboxylic acid, in particular versatic acid vinyl ester (VeoVa9$^R$, VeoVa10$^R$), which optionally also comprise 1 to 40% by weight of ethylene; vinyl ester/ acrylic acid ester copolymers with 30 to 90% by weight of vinyl ester, in particular vinyl acetate, and 1 to 60% by weight of acrylic acid ester, in particular n-butyl acrylate or 2-ethylhexyl acrylate, which optionally also comprise 1 to 40% by weight of ethylene;

vinyl ester/acrylic acid ester copolymers with 30 to 75% by weight of vinyl acetate, 1 to 30% by weight of vinyl laurate or vinyl esters of an a-branched carboxylic acid, in particular versatic acid vinyl ester, and 1 to 30% by weight of acrylic acid ester, in particular n-butyl acrylate or 2-ethylhexyl acrylate, which optionally also comprise 1 to 40% by weight of ethylene;

vinyl ester copolymers with esters of maleic acid or fumaric acid, such as the diisopropyl, di-n-butyl, di-t-butyl, di-ethylhexyl or methyl t-butyl ester, for example vinyl acetate copolymers with 10 to 60% by weight of one or more of the maleic/fumaric acid esters mentioned, which optionally also comprise ethylene or other copolymerizable vinyl esters, such as vinyl laurate or versatic acid vinyl ester.

Examples of suitable (meth)acrylic acid polymers are: homopolymers of n-butyl acrylate or 2-ethylhexyl acrylate; copolymers with 35 to 65% by weight of methyl methacrylate and 65 to 35% by weight of n-butyl acrylate and/or 2-ethylhexyl acrylate.

Examples of vinyl chloride polymers are, in addition to the abovementioned vinyl esters/vinyl chloride copolymers, vinyl chloride/ethylene copolymers.

Examples of styrene polymers are styrene/butadiene copolymers and styrene/acrylic acid ester copolymers, such as styrene/n-butyl acrylate or styrene/2-ethylhexyl acrylate with a styrene content of in each case 1 to 70% by weight.

If appropriate, the polymers mentioned also comprise 0.05 to 30.0% by weight, preferably 0.5 to 15% by weight, in each case based on the total weight of the polymer, of one or more auxiliary monomer units for improving the water-solubility, for crosslinking and for modification of the adhesion properties.

Suitable auxiliary monomers for improving the water-solubility are, for example, α,β-monoethylenically unsaturated mono- and dicarboxylic acids and amides thereof, such as acrylic acid, methacrylic acid, maleic acid, fumaric acid, itaconic acid, acrylamide and methacrylamide; ethylenically unsaturated sulphonic acids and salts thereof, preferably vinylsulphonic acid and 2-acrylamido-propanesulphonate, and/or N-vinylpyrrolidone.

The polymer preferably comprises monomer units having a crosslinking action to the extent of 0.5 to 5.0% by weight, based on the total weight of the polymer. Examples of these are N-methylolacrylamide or N-methylolmethacrylamide; N-(alkoxymethyl)acrylamides or N-(alkoxymethyl) methacrylamides with a $C_1$- to $C_6$-alkyl radical, such as N-(isobutoxymethyl)acrylamide (IBMA), N-(isobutoxymethyl)methacrylamide (IBMMA), N-(n-butoxymethyl)acrylamide (NBMA), N-(n-butoxymethyl) methacrylamide (NBMMA); and poly-ethylenically unsaturated comonomers, such as ethylene glycol diacrylate, 1,3-butylene glycol diacrylate, 1,4-butylene glycol diacrylate, propylene glycol diacrylate, divinyl adipate, divinylbenzene, vinyl methacrylate, vinyl acrylate, allyl methacrylate, allyl acrylate, diallyl maleate, diallyl phthalate, diallyl fumarate, methylene-bisacrylamide, cyclopentadienyl acrylate or triallyl cyanurate.

Comonomer units which are suitable for modification of the adhesion properties are, for example, hydroxyalkyl esters of methacrylic acid and acrylic acid, such as hydroxyethyl, hydroxypropyl or hydroxybutyl acrylate or methacrylate, and compounds such as diacetone-acrylamide and acetylacetoxyethyl acrylate or methacrylate.

The water-insoluble polymers mentioned, which can be polymerized by free radicals, are preferably prepared by the emulsion polymerization process in a temperature range from 0 to 100° C., and the preparation is initiated with the water-soluble agents which form free radicals and are usually employed for emulsion polymerization. Dispersion agents which can be employed are all the emulsifiers usually used in emulsion polymerization. The polymerization is carried out at a pH of preferably 2 to 7. Before the drying, the dispersion is preferably adjusted to a solids content of 20 to 65%.

Substances which are preferred as component b) are homo- or copolymers of acrylic acid, methacrylic acid or maleic acid (anhydride), in particular polyacrylic acid or polymethacrylic acid. Copolymers with acrylic acid, methacrylic acid or maleic acid (anhydride) units and units of monomers which can be copolymerized with these, in particular with the proviso that the acid content in these copolymers is more than 80 mol %, are furthermore preferred. Examples of copolymerizable monomers are alkenes, such as ethylene, propylene, vinylaromatics, such as styrene, acrylic acid esters, such as butyl acrylate, methacrylic acid esters, such as methyl methacrylate, alkyl vinyl ethers, such as methyl vinyl ether, methacrylamide and acrylamide. Preferred comonomers are (meth)acrylic acid esters, alkyl vinyl ethers and (meth)acrylamides. Examples of preferred copolymers are maleic acid/methyl vinyl ether, methacrylic acid/methyl methacrylate and methacrylic acid/acrylamide copolymers. Mixtures of the homo- and copolymers mentioned can also be employed.

The molecular weights of the polymers mentioned are ≦250,000 g/mol, preferably ≦150,000 g/mol; the molecular weight is particularly preferably from 5000 to 50,000 g/mol, determined as the weight-average, for example by means of gel permeation chromatography.

The polymers described as component b) are usually prepared by processes known to the expert, for example solution polymerization or bulk polymerization. These polymers are often also commercially obtainable.

The content of component b) in the dispersion powder composition is preferably 2 to 40% by weight, particularly preferably 5 to 25% by weight, based on the base polymer.

Examples of antiblocking agents (component c) are finely ground aluminium silicates, kieselguhr, pyrogenically produced silicon dioxide, precipitated silicic acid, colloidal silica gel, micro-silica, kaolin, talc, diatomaceous earth, calcium carbonate and magnesium hydrosilicates. The content of antiblocking agent is preferably 4 to 20% by weight, based on the total weight of polymeric constituents.

If appropriate, the dispersion powder composition can also comprise further additives, depending on the intended field of use.

For use as adhesives, the dispersion powder composition can preferably also comprise up to 100% by weight, in each case based on the base polymer, of tackifying substances (tackifiers), such as colophony, dimerized colophony, hydrogenated colophony and/or esters of the colophony types mentioned; polyterpene resins, coumarone-indene resins, terpene-phenol resins or hydrocarbon resins, if appropriate in combination with high-boiling substances, such as, for example, butyldiglycol acetate, butyldiglycol or propylene diglycol ethers or esters; and plasticizers, such as phthalic acid esters, sebacic acid esters or adipic acid esters. The colophony types mentioned and esters thereof and butyldiglycol acetate and (2-hydroxyethyl)phenyl ether are preferred.

If appropriate, the composition can also additionally comprise 0.5 to 20% by weight, preferably 0.5 to 10% by weight, based on the base polymer, of hydrophobicizing agent, for example based on polysiloxanes or metal soaps.

The composition can furthermore also comprise 0.1 to 2.0% by weight, preferably 0.1 to 1.0% by weight, based on the base polymer, of surface-active substances, such as emulsifiers or wetting agents. Examples of these are anionic and nonionic surfactants.

If appropriate, the compositions can also additionally comprise 0.5 to 15% by weight, preferably 0.5 to 10% by weight, based on the base polymer, of thickening agents, for example based on high molecular weight polyacrylic acids.

Another example of additives which can be used are defoamers, which can be employed, if appropriate, up to an amount of 0.05 to 2.0% by weight, preferably 0.05 to 1.0% by weight, based on the base polymer.

In a preferred embodiment, the dispersion powder composition according to the invention also comprises neutralizing agents. These are preferably admixed to the powder after drying, if appropriate in combination with other pulverulent additives. The amount of neutralizing agent to be employed depends on the particular dispersion powder composition. The customary inorganic bases are suitable; examples of these are NaOH, KOH and $Ca(OH)_2$.

For use in building materials, the compositions can also additionally comprise 1.0 to 30% by weight, preferably 1.0 to 15% by weight, based on the base polymer, of cement liquefier; for example styrene/maleic anhydride copolymers, sulphonate group-containing condensation products of melamine or ketone and formaldehyde and/or naphthalenesulphonic acid-formaldehyde and/or phenolsulphonate-formaldehyde condensation products.

To prepare the dispersion powder composition, the base polymer a) is employed as an aqueous dispersion. The atomizing protective colloid b) is preferably added to and mixed into this dispersion in the form of an aqueous solution. These mixing operations can proceed in any desired sequence, and it is only important that a homogeneous dispersion mixture is present. The thickening agents, surface-active substances, hydrophobicizing agents and defoamers to be employed, if appropriate,,and, if appropriate, further additives are preferably added to the aqueous mixture before drying. If the use of tackifying additives (tackifiers) is desired, these are preferably added as the first component to the dispersion of the base polymer. The tackifier can be added here in solution, in bulk (as a solid or liquid), as a melt or as an aqueous emulsion/dispersion. If the tackifier is employed in bulk, adequate thorough mixing during incorporation into the dispersion of the base polymer is to be ensured.

If an atomizing protective colloid b) with an acid content of >80 mol % is added, a pH of less than 4.5 is in general present in the mixture to be atomized, and it is thus ensured that the atomizing protective colloid is present in a non-neutralized or partly neutralized form and gives redispersible systems. If appropriate, the pH of the mixture must be adjusted accordingly before the atomization. For example, the suitable pH can easily be established by checking the redispersibility on dried films of aqueous mixtures of the base polymer with the atomizing protective colloid at a varying pH.

After the components have been mixed, the dispersion is dried, preferably spray dried or freeze dried, particularly preferably spray dried. Known devices, such as, for example, spraying through multi-component nozzles or with a disc in a stream of dry gas, which may be heated, can be resorted to here. In general, air, nitrogen or nitrogen-enriched air is employed as the drying gas, the drying gas temperature in general not exceeding 250° C. The optimum temperature of the drying gas can be determined in a few experiments; drying gas temperatures above 60° C. have often proved to be particularly appropriate.

An antiblocking agent c) can be added to the powder to increase the storage temperature, for example in order to prevent caking and blocking and/or to improve the flow properties of the powder. This addition is preferably carried out as long as the powder is still finely dispersed, for example still suspended in the drying gas. In particular, the antiblocking agent is metered into the drying device separately from but at the same time as the dispersion.

If the dispersion powder composition is to comprise one or more neutralizing agents, these are preferably added to the dispersion powder in a solid form. However, the neutralizing agents can also be metered into the drying device separately from but at the same time as the dispersion. Spray drying has proved to be particularly appropriate for this process variant.

The dispersion powder composition can be employed as such in the uses described below. The dispersion powder composition is usually employed in dry formulations which are stirred with water before use.

The dispersion powder composition can furthermore first be redispersed in water and then modified with further additives in the form of the redispersion.

On the basis of the atomizing protective colloid component b) claimed, dispersions with a deactivated protective colloid can be obtained by means of neutralization of component b). The neutralization can be carried out here by redispersing a dispersion powder composition, which already comprises the corresponding amount of neutralizing agent and is preferably present in a ready-to-use dry formulation, in water, the amount of neutralizing agent in the powder being chosen such that the desired pH range is established on redispersion. Another possibility comprises redispersing or dispersing a dispersion powder composition or dry formulation which is not modified with neutralizing agent in water and establishing the desired pH range by subsequent addition of neutralizing agent, such as, for example, NaOH, KOH or $Ca(OH)_2$. For certain applications, such as, for example, flooring adhesives, deactivation of the protective colloid by neutralization can also be omitted, where appropriate.

The invention therefore furthermore relates to aqueous polymer dispersions, preferably having a pH of 5 to 10, obtainable by redispersing the abovementioned dispersion powder composition or dry formulations with the abovementioned dispersion powder compositions in water, the pH being adjusted if appropriate. The solids content of the dispersions depends on the intended use and is in general 10 to 80%.

The dispersion powder compositions according to the invention and the aqueous dispersions obtainable with these are particularly suitable for use in adhesive compositions, in particular in pressure-sensitive adhesive compositions and flooring adhesives. The powders and dispersions are furthermore suitable as binders in plasters, paints and coatings (for example sealing slurries), as binders in cement-free and cement-containing stopping compositions, as building adhesives and as binders for adhesives or coatings in textile use.

In contrast to dispersion powders or aqueous dispersions obtainable therefrom which comprise protective colloids which cannot be deactivated, formulations in which the advantageous properties of the base polymer, for example in respect of tackiness (tack), water resistance and mechanical strength, are not completely or partly compensated by the adverse influence of the atomizing protective colloid but have their full effect are accessible with the systems according to the invention. Pulverulent adhesives or adhesive dispersions which also have the tackiness required for pressure-sensitive adhesives without the addition of a tackifier are surprisingly accessible with these formulations.

The following examples serve to further illustrate the invention.

EXAMPLES

Substances Used

Dispersion DI-1

Emulsifier-stabilized aqueous dispersion with a solids content of 60% based on a vinyl acetate/ethylene/ethylhexyl acrylate copolymer with a 2-ethylhexyl acrylate content of 48% by weight, a vinyl acetate content of 36% by weight and an ethylene content of 16% by weight from Wacker-Chemie GmbH.

Dispersion DI-2

Emulsifier-stabilized aqueous dispersion with a solids content of 61% based on a vinyl acetate/ethylene copolymer with an ethylene content of 45% by weight and a vinyl acetate content of 55% by weight from Wacker-Chemie GmbH.

Dispersion DI-3

Emulsifier-stabilized aqueous dispersion with a solids content of 51% based on a vinyl acetate/ethylene copolymer with an ethylene content of 12% by weight and a vinyl acetate content of 88% by weight from Wacker-Chemie GmbH.

Dispersion DI-4

Emulsifier-stabilized aqueous dispersion with a solids content of 60% based on a 2-ethylhexyl acrylate/vinyl acetate copolymer with a 2-ethylhexyl acrylate content of 90% by weight and a vinyl acetate content of 10% by weight from Wacker-Chemie GmbH.

Atomizing Protective Colloid Sokalan-CP13

Sokalan CP13 is a polyacrylic acid having a molecular weight of about 20,000 from BASF.

Atomizing Protective Colloid Versicol-K11

Versicol-K11 is a polymethacrylic acid having a molecular weight of about 10,000 from Allied Colloids.

Tackifier T-1

Tackifier T-1 is a mixture of 20% by weight of Plastilit-DS3431 (2-hydroxyethyl)phenyl ether from BASF, and 80% by weight of a Central American balsam resin of the Maya type from Willers, Engel & Co.

Example 1

4000 parts by weight of dispersion D-1, 1920 parts by weight of Versicol-K11 as a 25% strength aqueous solution (20% based on DI-1 resin) and 1050 parts by weight of water were mixed thoroughly. The pH of the dispersion was 3.4. The mixture was spray dried by means of a two-component nozzle. Air pre-compressed to 3 bar was used as the atomizing component; the droplets formed were dried in counter-current with drying air heated to 120° C. The resulting dry powder was mixed with 10% by weight of a commercially available antiblocking agent based on kaolin.

Comparison Example 1

The dispersion powder was prepared in accordance with Example 1, but the pH of the atomizing batch was increased to pH 5.2 by addition of NaOH.

Example 2

2000 parts by weight of dispersion DI-1 and 1200 parts by weight of tackifier T-1 (100% based on DI-1 resin) were mixed homogeneously. 1907 parts by weight of Versicol-K11 (20% based on DI-1 resin and tackifier T-1) as a 25% strength aqueous solution and 1000 parts by weight of water were then mixed in thoroughly. The pH of the mixture was 2.8. The mixture was spray dried by means of a two-component nozzle. Air pre-compressed to 3 bar was used as the atomizing component; the drops formed were dried in counter-current with drying air heated to 120° C. The resulting powder was mixed with 10% of a commercially available antiblocking agent based on kaolin.

Comparison Example 2

The dispersion powder was prepared in accordance with Example 2, but the pH of the atomization batch was increased to pH 5.6 with NaOH.

Comparison Example 3

The procedure was as in Example 1, but instead of 1920 parts by weight of a 25% strength aqueous Versicol-K11 solution, only 1440 parts by weight (15%, based on DI-1 resin) were employed. The pH of the mixture was 3.6.

Example 3

4000 parts by weight of dispersion DI-4, 1920 parts of Versicol-K11 as a 25% strength aqueous solution (20% based on DI-4 resin) and 950 parts by weight of water were mixed thoroughly. The pH of the mixture was 3.4. Spray drying was carried out analogously to Example 1. The resulting dry powder was mixed with 10% of a commercially available antiblocking agent based on kaolin.

Example 4

4000 parts by weight of dispersion DI-2, 1743 parts by weight of Sokalan-CP13 as a 28% strength aqueous solution (20% based on DI-2 resin) and 1500 parts by weight of water were mixed thoroughly. The pH of the mixture was 2.6. The mixture was spray dried by means of a two-component nozzle. The dispersion powder was prepared in accordance with Example 1. The use of an antiblocking agent was omitted.

Example 5

4000 parts by weight of dispersion DI-3 and 729 parts by weight of Sokalan-CP13 as a 28% strength aqueous solution (10% based on DI-3 resin) were mixed thoroughly. The pH of the mixture was 2.2. The dispersion powder was prepared in accordance with Example 1. The use of an antiblocking agent was omitted.

Example 6

The procedure was as in Example 5, but instead of 729 parts by weight of a 28% strength aqueous Sokalan-CP13 solution, 816 parts by weight of a 25% strength solution of Versicol-K11 (10% based on DI-3 resin) were employed. The pH of the mixture was 2.4.

Use Studies

Deactivation of the Atomizing Protective Colloid

To investigate the deactivation of the atomizing protective colloid, the influence of the pH of the dispersion to be atomized on the redispersibility of the dispersion powder obtainable therefrom was investigated. For this, 50 g of the particular dispersion powder was stirred into 50 g of water and the redispersibility was evaluated qualitatively in the tube settling test by means of a graduated glass tube. Table 1 shows how, by neutralization of the protective colloid, this is activated and redispersible systems become non-redispersible systems by a simple change in pH.

TABLE 1

| Dispersion powder | pH of the atomization batch | Redispersibility of the dispersion powder |
|---|---|---|
| Example 1 | 3.4 | good |
| Comparison Example 1 | 5.2 | poor |
| Example 2 | 2.8 | good |
| Comparison Example 2 | 5.6 | poor |
| Example 5 | 2.2 | very good |
| Comparison Example 3 | 5.3 | poor |

Improvement in the Use Properties on Deactivation of the Atomizing Protective Colloid To investigate the influence of deactivation of the atomizing protective colloid on the use properties, the influence of the pH of the redispersion on the tack of pressure-sensitive adhesive films produced therefrom was investigated. For this, 50 g of the particular dispersion powder was stirred into 50 g of water, and the pH stated in Table 2 was established by addition of NaOH. For comparison, the redispersions were in each case not neutralized. The redispersions were knife-coated onto a carrier film and dried at 60° C. The tackiness of the film (tack) was evaluated qualitatively. Table 2 shows how, by neutralization of the protective colloid, this is deactivated and the tackiness of the film, from otherwise identical dispersions, is improved drastically by the neutralization of the protective colloid.

TABLE 2

| Powder | pH of the redispersion | Neutralizing agent | pH established | Tack |
|---|---|---|---|---|
| Example 1 | 3.6 | NaOH | 6.8 | high |
| Example 1 | 3.6 | — | 3.6 | very low |
| Example 2 | 3.1 | NaOH | 7.2 | very high |
| Example 2 | 3.1 | — | 3.1 | low |
| Example 3 | 3.4 | NaOH | 7.0 | high |
| Example 3 | 3.4 | — | — | low |
| Example 4 | 2.8 | NaOH | 7.0 | high |
| Example 4 | 2.8 | — | 2.8 | low |

Testing in a Powder Paint Recipe

Powder paints were prepared in accordance with the recipes shown in Table 3:

TABLE 3

| Powder paint recipe | | | |
|---|---|---|---|
| Designation | Recipe A [g] | Recipe B [g] | Recipe C [g] |
| Calcite (1–6 μm, ON 22) | 128.5 | — | — |
| Talc (3 μm, ON 53) | 148.0 | 148.0 | 148.0 |
| $TiO_2$ (Kronos 2190) | 73.5 | 73.5 | 73.5 |
| Talc (8 μm, ON 35) | 63.5 | 63.5 | 63.5 |
| Cellulose fibres | 16.0 | 16.0 | 16.0 |
| Aluminium silicate | 12.0 | 12.0 | 12.0 |
| Modified hydroxycellulose | 3.0 | 3.0 | 3.0 |
| $Ca(OH)_2$ | 3.0 | 3.0 | — |

TABLE 3-continued

| Powder paint recipe | | | |
|---|---|---|---|
| Designation | Recipe A [g] | Recipe B [g] | Recipe C [g] |
| Defoamer | 1.5 | 1.5 | 1.5 |
| Kaolin (<5 μm, ON 48) | — | 128.5 | 128.5 |

(ON=oil number, μm=average particle size;)

Powder paints with the PVC stated in Table 4 were prepared from the powders stated in Table 4 and the recipe stated in Table 3. The dry mixture was incorporated into water using a dissolver. The liquid paint thus obtained was applied such that a dry coating thickness of about 100 μm was achieved. After storage in a standard climate for 28 days, the wet abrasion resistance was determined in accordance with DIN 53778.

Table 4 shows how, by neutralization of the protective colloid, this is deactivated and the pigment-binding capacity of paint recipes is improved drastically, using otherwise identical redispersions, by neutralization of the protective colloid.

TABLE 4

| Testing of powder paints | | | | | |
|---|---|---|---|---|---|
| Powder | pH of the redispersion | Recipe | PVC | pH of the paint | Wet abrasion* |
| Example 5 | 2.8 | A | 69 | 7.8 | >5000 |
| Comparison Example 3 | 5.5 | A | 69 | 9.0 | 145 |
| Example 7 | 2.7 | A | 69 | 7.6 | 2800 |
| Example 6 | 2.8 | C | 78 | 5.7 | 390 |
| Example 6 | 2.8 | B | 78 | 11.5 | 1085 |

C=recipe without neutralizing agent

*scrubbing cycles after storage in a standard climate for 28 days

What is claimed is:

1. Process for the preparation of a redispersible dispersion powder composition by drying an aqueous mixture comprising:

a) a water-insoluble base polymer having a glass transition temperature of −60° C. to +80° C. from the group consisting of homo- and copolymers of vinyl esters, acrylic acid esters, methacrylic acid esters, styrene and vinyl chloride, or a mixture of the base polymers mentioned b) 2 to 40% by weight, based on the base polymer, of a water-soluble atomizing protective colloid, and c) 0 to 30% by weight, based on the total weight of polymeric constituents, of an antiblocking agent, wherein component b) comprises non-neutralized homo- or copolymers of olefinically unsaturated mono- or dicarboxylic acids or anhydrides thereof, or partly neutralized copolymers of olefinically unsaturated mono- or dicarboxylic acids or anhydrides thereof having an acid content of >80 mol % in the case of copolymers with $C_3$- to $C_{12}$-alkenes or styrene and an acid content of 50 to 99 mol % in the case of the other copolymers, the molecular weight of the polymers mentioned being 250,000 g/mol, determined as the weight-average, and wherein the pH of the mixture prior to drying is adjusted to a pH of less than 4.5.

2. The process of claim 1 wherein component b) is non-neutralized homo- or copolymers of olefinically unsaturated mono- or dicarboxylic acids or anhydrides thereof, having an acid content of >80 mol % in the case of copolymers with C3- to C12-alkenes or styrene and an acid content of 50 to 99 mol % in the case of the other copolymers, the molecular weight of the polymers mentioned being 250,000 g/mol, determined as the weight-average.

3. The process of claim 2 which comprises as component b) copolymers of unsaturated mono- or dicarboxylic acids or anhydrides thereof with C3- to C12 alkenes, vinylaromatics, acrylic acid esters, alkyl vinyl ethers methacrylamide or acrylamide.

4. The process of claim 2 which comprises as component b) homo- or copolymers of acrylic acid, methacrylic acid, maleic acid or anhydrides thereof.

5. The process of claim 2 which comprises as component b) polyacrylic acid.

6. The process of claim 2 which comprises as component b) polymethacrylic acid.

7. The process of claim 2 which comprises as component b) polymaleic acid.

8. The process of claim 2 which comprises a component b) copolymers of unsaturated mono- or dicarboxylic-acids or anhydrides thereof with C3–C12 alkenes.

9. The process of claim 2 which comprises as component b) polymaleic acid with styrene.

10. The process of claim 2 which comprises as component b) polymaleic acid with acrylic-acid esters.

11. A dry redispersible powder composition prepared according to the process of claim 2.

* * * * *